UNITED STATES PATENT OFFICE.

WILLIAM GARDINER, OF CHICAGO, ILLINOIS, ASSIGNOR, BY MESNE ASSIGNMENTS, TO HENRY T. CLARKE, JR., TRUSTEE.

METHOD OF PRODUCING STORAGE-BATTERY PLATES.

SPECIFICATION forming part of Letters Patent No. 724,387, dated March 31, 1903.

Application filed December 13, 1900. Serial No. 39,600. (No specimens.)

*To all whom it may concern:*

Be it known that I, WILLIAM GARDINER, a citizen of the United States, residing at Chicago, county of Cook, and State of Illinois, have invented certain new and useful Improvements in Methods of Producing Storage-Battery Plates; and I do hereby declare the following to be a full, clear, and exact description of the invention, such as will enable persons skilled in the art to which it appertains to make and use the same.

My invention relates to improvements in processes for electrochemically forming the elements of electric accumulators.

The object of my invention is to hasten the time and to cheapen the process necessary to convert metallic lead plates into proper condition to render them active and finally to subject the said plates to a supplementary process, which I designate a "bonding" process, the object of which is to eliminate the results of the solutions which have been used in the former steps of my process before charging said elements and to increase the adhesion between the lead structure of the elements and the oxid and spongy material formed upon the respective elements.

In carrying my process into practice I pursue the following course or mode of procedure: The plates that are to form the elements of the battery-cell comprise an active portion of pure lead and a frame of an alloy of lead and antimony or of any metal or alloy that will remain practically unaffected by the electrolytic action. The pure lead placed in the frame is preferably in a porous or finely-divided condition.

In forming the plates or elements I prefer to use pure sheets of lead as one of the electrodes in the electrolyte in which the elements are formed. These sheets of lead I shall designate "dummy" electrodes, because they are not the true electrodes that are designed to become a component part of the cell to be produced.

My complete method comprises three steps; but any one of the steps may be used singly.

The first step consists in subjecting the plates as positive electrodes to the action of a certain electrolyte for the purpose of oxidizing the metallic lead.

The second step consists in subsequently subjecting the oxidized plates as negative electrodes to the action of another electrolyte, and thereby reducing the oxid to spongy lead.

The third and last step consists in again subjecting the plates as positive electrodes to a third electrolytic bath. The object of this latter treatment is to harden and toughen the active material and increase the cohesion between its particles and between it and the supporting main part or body of the plate. To each gallon of a ten-per-cent. solution of sulfuric acid I add five ounces of sulfate of aluminium, five ounces of nitrate of ammonia, and one ounce of oxalic acid. A small amount of tartaric acid may also be added. The plates designed to subsequently become the positive and negative elements of the battery-cells are submerged in this bath. Then the positive wire from a source of electric current is connected to the plates, so that the current will enter the plates, pass through the electrolyte, and leave the negative or dummy electrodes. The density of the current should be adjusted so that about two or three amperes per square foot of plate-surface shall pass through the bath. The density of the current, however, will depend upon the condition and concentration of the electrolyte and possibly upon exterior influences. The current should be continued until the lead plates have been sufficiently oxidized. If there have been previously formed in the lead plate openings in the nature of slots, grooves, or perforations, these openings will be practically filled with such material. The plates should be about the color of an equal mixture of salt and pepper when the first step has been completed. To convert the oxid to spongy lead, I remove the plates from the electrolyte just described and place them in an electrolyte which I term the "reversing" solution. This solution consists of a solution of sulfuric acid, to each gallon of which is added three ounces of tartaric acid and five ounces of sulfate of magnesia. After the plates have been placed in this electrolyte the current is directed from the dummy electrodes through the liquid to the oxidized plates and converts or reduces the oxid in the plates to spongy metallic lead. The current should be adjusted so that approximately fifteen amperes per square foot of plate-surface will flow through the electrolyte. The current should be continued until the oxid has been entirely reduced to spongy lead. For the purpose of causing this mass of spongy lead to adhere more tenaciously to the metal support I put the plates thus formed in an electrolyte which with the coöperation of the electric current will bond the two substances and effect a close adhesion between the lead structure and the cohering mass of spongy lead. This I call my "bonding" solution, which may consist of fifteen ounces of sulfite of soda and eight ounces of sulfid of ammonium dissolved in a gallon of water. Before the plates are placed in this electrolyte I connect each alternate plate to a common electric conductor in two groups. The current-wires are then connected to the two groups, those to which the positive wire is connected becoming the positive or oxidized plates in the completed cell. A current of about the same value as that required to charge the completed cells should be passed while the plates are in this solution for twelve or fifteen hours, or until they are fully and completely bonded. After this third and last step has been completed the plates should be removed, washed, and finally charged in a sulfuric-acid solution having a specific gravity of about 1.2, when they will be ready for commercial service.

The bonding electrolyte solution may be composed of water and any soluble sulfur compound having a lower degree of oxidation than sulfuric acid—for example, any of the soluble alkaline sulfids or sulfites, either singly or in combination, such as sulfites, hyposulfites, or sulfids of ammonium, magnesium, sodium, or potassium.

The effect of my process is to convert the greatest quantity of solid metallic lead into spongy lead in the shortest space of time and at a minimum of cost and without the usual annoyance of boiling the solutions, freezing the solutions, pickling the plates, corroding the plates, and other expensive, tedious, and delaying expedients. It also preserves the spongy deposit in its primitive state with reference to its hygroscopic nature, so that its available surface is not decreased when it is otherwise converted into a condition to withstand the ordinary commercial hard usage.

I do not desire to be understood as limiting my process to the exact proportion of the solutions nor to the exact materials composing such solutions, as any suitable equivalent may be employed without departing from the gist of my invention as set out in the claims. Neither does my process necessarily include all of the steps hereinbefore described, as any one of the steps may be used to perform its function and other means may be used to complete the remaining steps necessary to the completed process.

The terms "sulfates," "nitrates," "oxalates," "tartrates," "sulfids," and "sulfites" as used in the claims are intended to cover any compounds having these acid radicals, whether in combination with a metal or with hydrogen, the base being in general immaterial.

Having thus described my invention, what I claim as new, and desire to secure by Letters Patent, is—

1. The process of oxidizing lead plates, which consists in passing an electric current from the plates through an electrolyte containing in solution three acids one of which is a good solvent of lead, another a poor solvent of lead, and the third an organic acid.

2. The process of oxidizing lead plates, which consists in passing an electric current from the plates through an electrolyte containing in solution an acid which is a good solvent of lead, an acid which is a poor solvent of lead, and oxalic acid.

3. The process of oxidizing lead plates, which consists in passing an electric current from the plates through a solution containing a sulfate, a nitrate, and an organic acid.

4. The process of oxidizing lead plates, which consists in passing an electric current from the plates, as positive electrodes, through a solution containing a sulfate, a nitrate, and an oxalate.

5. The process of oxidizing lead plates, which consists in passing an electric current from the plates, as positive electrodes, through an electrolyte containing a solution of sulfuric acid, aluminium sulfate, a nitrate and an oxalate.

6. The process of reducing oxidized lead plates, which consists in passing an electric current to the plates through a solution containing sulfuric acid and magnesium sulfate.

7. The process of reducing oxidized lead plates, which consists in passing an electric current to the plates through a solution containing a sulfate and an organic acid.

8. The process of reducing oxidized lead plates, which consists in passing an electric current to the plates through a solution containing a sulfate and a tartrate.

9. The process of reducing oxidized lead plates, which consists in passing an electric current to the plates through a solution containing sulfuric acid, magnesium sulfate, and an organic acid.

10. The process of reducing oxidized lead plates, which consists in passing an electric current to the plates through a solution containing sulfuric acid, magnesium sulfate, and tartaric acid.

11. The process of bonding the active material of lead storage-battery plates, which consists in passing an electric current from the plates through a solution containing a soluble sulfur compound having a lower degree of oxidation than sulfuric acid.

12. The process of bonding the active material of lead storage-battery plates, which consists in passing an electric current from the plates through a solution containing a soluble sulfur compound having a lower degree of oxidation than sulfurous acid.

13. The process of bonding the active material of lead storage-battery plates, which consists in passing an electric current from the plates through a solution containing a soluble sulfur compound having a lower degree of oxidation than sulfuric acid, and a soluble sulfur compound having a lower degree of oxidation than sulfurous acid.

14. The process of bonding the active material of lead storage-battery plates, which consists in passing an electric current from the plates through a solution containing a soluble sulfid and a soluble sulfite.

15. The process of producing lead storage-battery plates, which consists in passing an electric current from the plates, as positive electrodes, through an electrolyte containing in solution an acid which is a good solvent of lead, an acid which is a poor solvent of lead and an organic acid; and reducing the resulting oxidized lead plates by passing an electric current to the plates through a solution containing a sulfate and a tartrate.

16. The process of producing lead storage-battery plates, which consists in passing an electric current from the plates, as positive electrodes, through a solution containing a sulfate, a nitrate, and an oxalate; and reducing the resulting oxidized lead plates, by passing an electric current to the plates through a solution containing a sulfate and a tartrate.

17. The process of producing storage-battery plates, which consists in first oxidizing the plates then reducing the oxidized lead plates by passing an electric current to said plates through a solution containing a sulfate and a tartrate, and then passing an electric current from the reduced plates through a solution containing a soluble sulfur compound having a lower degree of oxidation than sulfuric acid.

18. The process of producing lead storage-battery plates, which consists in first passing an electric current from the plates, through a solution containing a sulfate, a nitrate, and an oxalate; then passing an electric current to said plates through a solution containing a sulfate and a tartrate; and finally passing an electric current from said plates through a solution containing a soluble sulfur compound having a lower degree of oxidation than sulfuric acid.

19. The process of producing storage-battery plates which consists in passing an electric current from the plates, as positive electrodes, through an electrolyte containing in solution an acid which is a good solvent of lead, an acid which is a poor solvent of lead, and an organic acid; then reducing the resulting oxidized lead plates by passing an electric current to the plates through a solution containing a sulfate and a tartrate; and finally passing an electric current from the plates through a solution containing a soluble sulfur compound having a lower degree of oxidation than sulfuric acid.

20. The process of producing electrodes for electric accumulators or storage batteries which embraces the steps of first subjecting the electrode to the action of an electric current while immersed in an electrolyte which operates in connection with the electric current to oxidize the electrode; then subjecting the electrode to the action of an electric current while immersed in a bath containing an electrolyte which operates in connection with the electric current to change the oxidized portion of the electrode to spongy metallic lead; and then subjecting the electrode to the action of an electric current while immersed in a bath containing an electrolyte adapted in connection with the electric current to produce greater adhesion of the spongy portion of the electrode to the interior or body portion thereof.

In testimony whereof I have signed this specification, in the presence of two subscribing witnesses, this 7th day of December, A. D. 1900.

WILLIAM GARDINER.

Witnesses:
FORÉE BAIN,
M. F. ALLEN.